United States Patent [19]
Norris

[11] 3,938,767

[45] Feb. 17, 1976

[54] CABLE TRAY

[75] Inventor: George W. Norris, Syracuse, N.Y.

[73] Assignee: Crouse-Hinds Company, Syracuse, N.Y.

[22] Filed: Oct. 30, 1974

[21] Appl. No.: 519,086

[52] U.S. Cl.................. 248/58; 174/68 C; 403/49; 403/245; 248/68 R
[51] Int. Cl.².................... E21F 17/02; F16L 3/00
[58] Field of Search.......... 174/68 C, 72 A; 248/49, 248/58, 59, 68 R; 317/122; 403/49, 230, 245, 247, 256, 257, 263

[56] References Cited
UNITED STATES PATENTS

| 1,540,140 | 6/1925 | Ohnstrand | 403/247 |
| 3,266,202 | 8/1966 | Furer | 248/58 X |
| 3,521,843 | 7/1970 | Ogle | 248/68 R X |
| 3,791,613 | 2/1974 | Nollen | 248/49 |

FOREIGN PATENTS OR APPLICATIONS

| 2,115,416 | 11/1971 | Germany | 403/230 |
| 1,217,710 | 5/1966 | Germany | 248/225 |

Primary Examiner—Roy D. Frazier
Assistant Examiner—Lawrence J. Staab
Attorney, Agent, or Firm—Bruns & Jenney

[57] ABSTRACT

A cable tray has side rails and rungs formed from sheet metal. The side rails have outwardly opening upper and lower grooves which are keystone shaped in that the open side of the groove is narrower than the inner side of the grooves. The lower groove provides an inwardly offset flange along the side rail and the hollow rungs, which are formed with a substantially square cross-sectional shape fit around substantially square portions of the flange which are defined by pairs of spaced vertical slots across the flange. The rung-ends have horizontally aligned rectangular slots through their sides and rung joiners, which have a rectangular cross-sectional configuration are driven through the aligned slots, the joiners having a drive fit between the closed vertical side of the flange and the ends of the aligned slots which are adjacent the end of the rung, thus forcing the rung end against the side rail web. Novel hangers are inserted in the side rail lower slots for supporting the tray sections and side rail connectors are provided for the upper and lower side rail grooves of endwise abutting sections. The connectors have a cross-sectional configuration conforming to that of the groove in which it is placed and pointed screws threaded through holes in the connectors hold them in place during erection of the tray.

4 Claims, 15 Drawing Figures

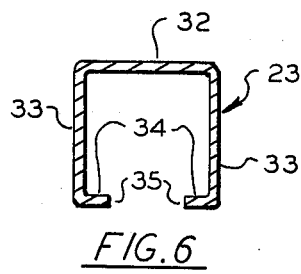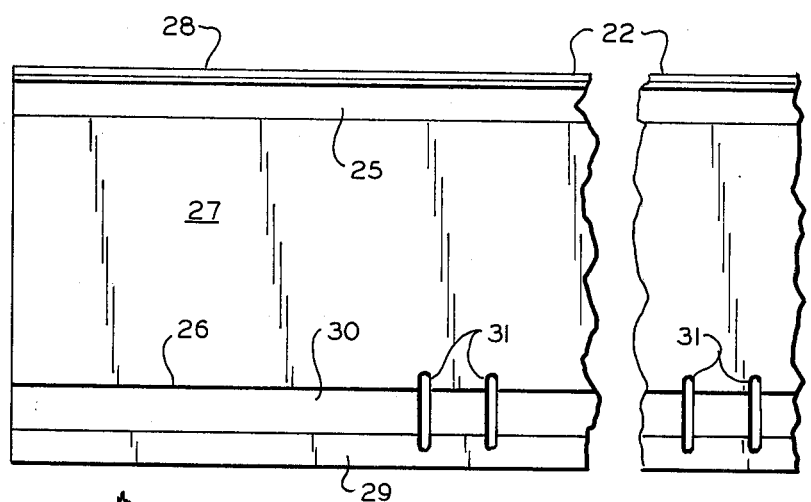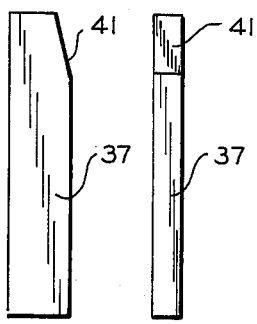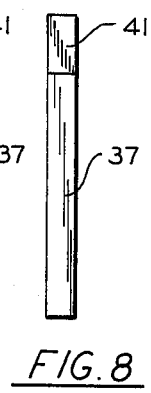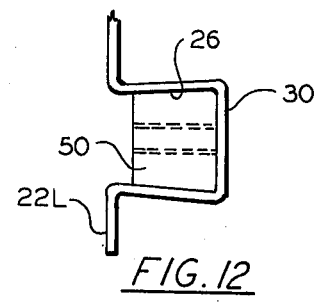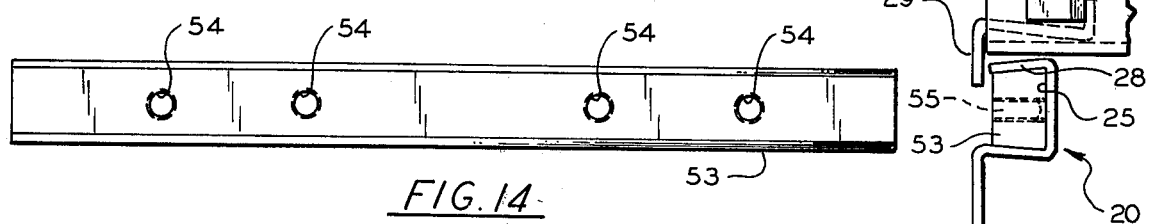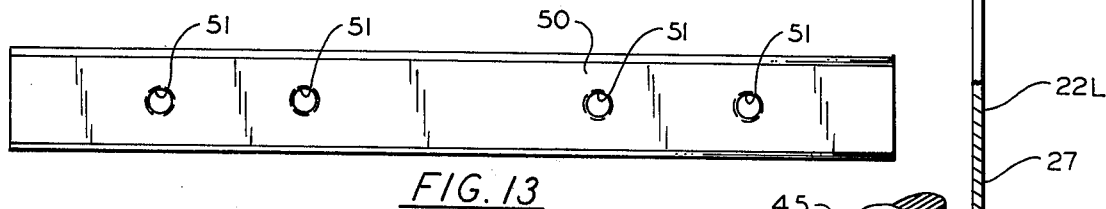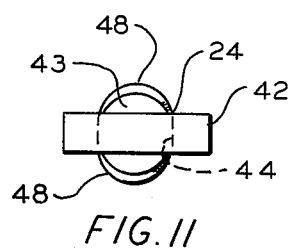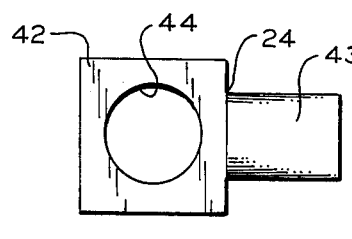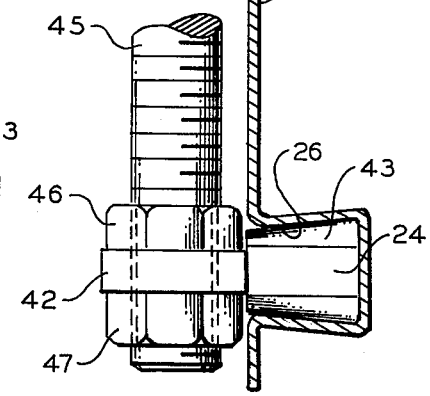

CABLE TRAY

BACKGROUND OF THE INVENTION

This invention relates generally to cable trays or cable ladders and more particularly to such cable supporting apparatus having sheet metal rungs beat into a square tubular configuration and side rails of sheet metal roll-formed to have an inwardly projecting hollow flange therealong which is slotted thereacross at intervals to provide substantially square portions of flange around which the rung ends fit and are secured by means of wedging means.

Many trays for supporting electrical cables in an elevated position are known which can be assembled from component parts chosen to form tray sections of selected width, heights and length but such apparatus require costly manufacturing processes such as welding or special tools for erection at the assembly site. Many such trays have cable-contacting parts having sharp edges, such as when expanded metal or other perforate parts are used, or have fastening means for securing the parts together, such as bolts or screws, which have irregular surfaces capable of coming in contact with the supported cables and injuring their insulation.

SUMMARY OF THE INVENTION

The cable tray of the present invention has parts which may be economically manufactured, stored at a central location and then shipped unassembled to the place of use for erection without special tools or equipment. The tray has side rails at each side, rung members, wedge-like joiners for securing the rungs to the side rails, and hangers for securing the tray to hanger rods or other tray supports. The tray is made in sections and side rail connectors are provided for aligning the sections in end-to-end relation.

Each side rail is roll-formed of sheet metal to have an upper, outwardly opening groove and a lower, outwardly opening groove therealong, each groove being keystone shaped, the open side of the groove being constricted. Connectors having a cross-sectional shape conforming to that of the groove are provided for aligning side rails of endwise connected sections. The connectors have threaded holes therethrough so that pointed screws may be advanced from the outer side of each side rail for securing the connectors in place in abutting side rails during erection.

The bent web about the lower groove of each side rails provides an inwardly projecting hollow flange adjacent to and extending along the bottom edge of the web. The rungs are formed of sheet metal bent into substantially a square hollow tube. Before the lower groove is formed each side rail has adjacent pairs of vertically extending slots stamped therethrough at predetermined intervals depending on the desired rung spacing. When the grooves are formed, these slots extend across the hollow flange formed by the lower groove. The space between the slots of each adjacent pair is such that the two vertical sides of a rung can be engaged therein, the hollow rung being engaged around a substantially square section of the flange.

Side rail length and height and rung length and spacing may be provided as desired.

For securing the rungs at their ends to the side rails, horizontally aligned slots through the sides of the rung are provided spaced from the end of the rung. As the sides of the rung are engaged in the flange slots the ends of the rung are in abutting relation to the web of the side rail above and blow the flange and access to aligned slots through the rung is provided by the rung spacing. Joiner pins which are rectangular in cross section are provided for securing a rail end to a respective side member. The joiners are longer than the rung width and have a taper at one end so a joiner may be fitted into one of the aligned slots through the rung side, the joiner having a thickness providing a slide fit with the side of the slot.

The aligned slots are at a selected distance from the end of the rung, however, and this distance is carefully chosen to provide a drive fit for the joiner between this end of the slot and the vertical portion of the rail flange so that the end of the rung is forced against the rail web when the joiner is driven through the aligned rung slots. Preferably two pairs of aligned slots are provided in the rail ends, one above the other. The slots are spaced from the rung top and bottom so that the joiner is also forced against the upper or lower side of the flange when the joiner is driven through the aligned slots in the rung side.

Since it is usually preferable to secure the rungs in place before hanging or otherwise supporting the tray section, novel hangers are provided which can be inserted in the side rail lower grooves between the rungs. Each hanger has a projecting portion at one end and a railengaging portion at the other end. The projecting portion is square, flat and thinner than the other portion and has a hole therethrough for engagement by the usual hanger rod or other support.

The hanger rail-engaging portion has a length substantially equal to the depth of the lower groove and a width permitting insertion into the groove when the projecting portion is vertically disposed. When the projecting portion is turned to extend horizontally, the upper and lower surfaces of the rail engaging portion are arcuately curved from side to side for permitting turning of the hanger. The curved upper and lower surfaces of the rail engaging portion are also tapered outwardly toward the hanger end so that, when the hanger is turned with its projecting portion horizontally disposed, the upper and lower surfaces conform to the cross-sectional keystone shape of the groove for securing the hanger in the groove.

BRIEF DESCRIPTION OF THE DRAWINGS

FIG. 3 on the second sheet of drawings is a fragmentary inner-side elevational view, on a reduced scale, of a side rail shown in FIG. 1;

FIG. 6 is a sectional view on the line 6—6 of FIG. 4;

FIGS. 7 and 8 are side elevational and edge elevational views, respectively, of a joiner shown in FIG. 2;

FIG. 9 is a fragmentary end elevational view of two tray sections, one stacked on top of the other, a portion of the side rail of the lower section being shown in section and showing a hanger, shown in FIG. 1, engaged therewith;

FIGS. 10 and 11 are plan and end elevational views, respectively, of the hanger shown in FIG. 9;

FIG. 12 is a fragmentary end elevational view of a side rail showing a lower groove connector engaged therewith;

FIG. 13 is a side elevational view of the connector shown in FIG. 12;

FIG. 14 is a side elevational view of an upper groove connector shown in end elevation in FIG. 9; and FIG. 15 is a setscrew used in conjunction with the connector of FIG. 13.

DESCRIPTION OF THE PREFERRED EMBODIMENT

Figure 1:
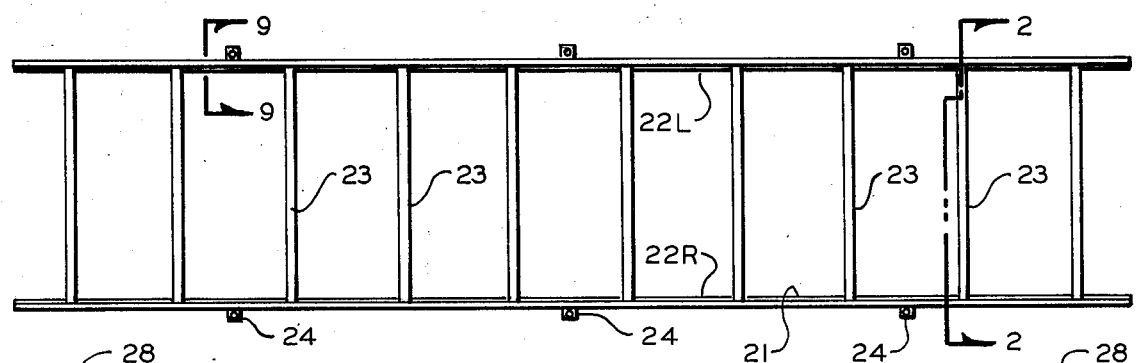
FIG. 1 is a plan view of an assembled tray section according to the invention.

Referring to FIG. 1, a cable tray section 21 of the cable tray 20 has side rails 22L and 22R at either side, rungs 23, and hangers 24.

Figure 2:
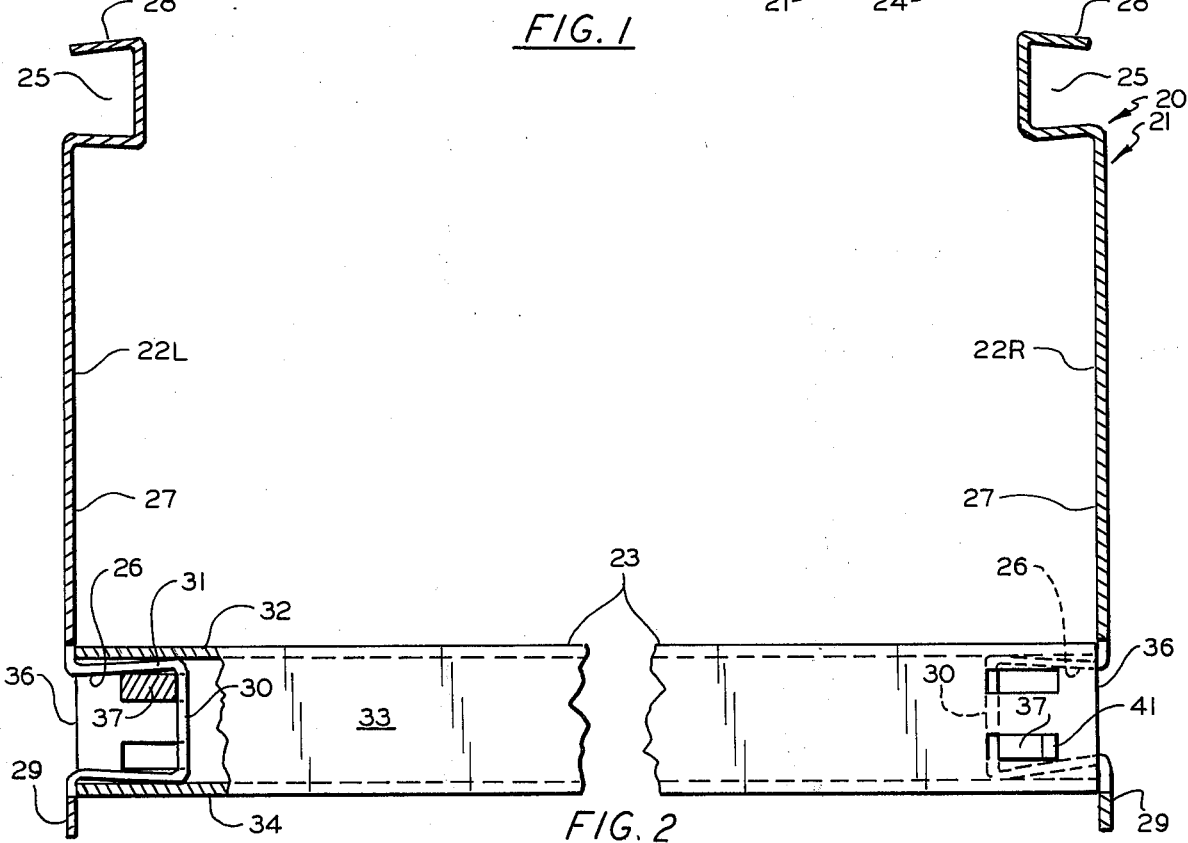
FIG. 2 is an enlarged, cross-sectional view on the line 2—2 of FIG. 1, the left rung end being cut away for clarity.

Referring to FIG. 2, each side rail 22 has an outwardly opening, keystone-shaped upper groove 25 and an outwardly opening, keystone-shaped, larger lower groove 26 along its upper and lower edges, roll-formed in its generally upstanding web 27. The open outer side of each groove is more constricted than its closed inner side.

The top side or flange 28 of the upper groove 25 extends outwardly of the rail, and the lower groove 26 has a pendant lower flange 29 generally aligned with web portion 27.

The three sides of lower groove 26 form an inwardly offset, hollow flange 30 and, referring to FIG. 3, the flange 30 has a spaced pair of slots 31—31 cut thereacross at a spaced interval, the interval determining the rung spacing. It will be understood that the slots 31 may be punched out of the web prior to forming flange 30 and each slot 31 may extend above and below the flange as shown.

Figure 4:
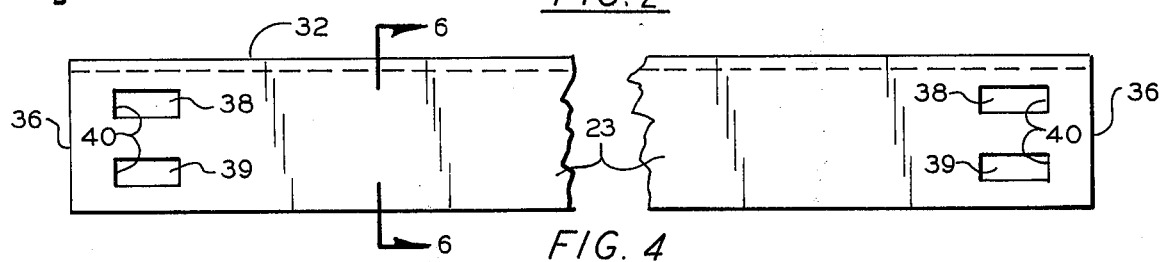
FIGS. 4 and 5 are side elevational and bottom plan views respectively of a rung shown in FIG. 2.
Figure 5:
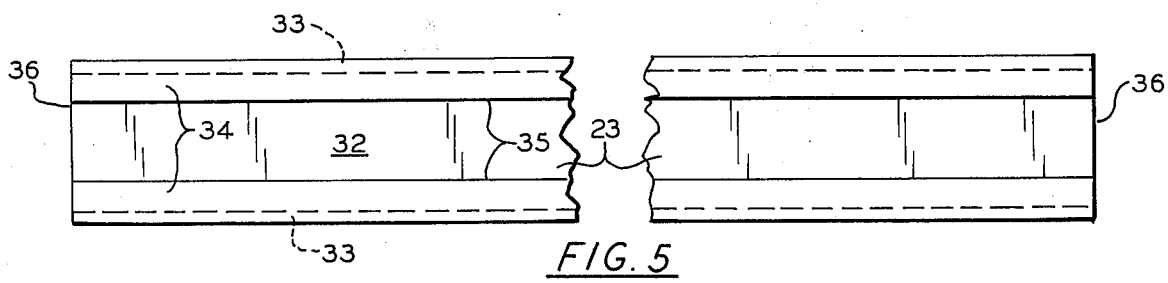

Referring now to FIGS. 4, 5 and 6, each rung 23 is formed of sheet metal bent substantially to the shape of a hollow square tube, as seen in FIG. 6. The rung top 32 is flat, the rung sides 33 depend vertically, and the rung bottom comprises two flanges 34 spaced on either side of a central opening 35. Opening 35 is provided for properly finishing the metal rung, as when it is galvanized if desired, and for providing access to screws securing cable separators to the rung top 32 if desired.

The paired slots 31—31 across flange 30 are spaced the distance between rung sides 33—33 whereby the rung sides may be slidingly engaged in the slots 31 and the ends 36 of each rung thus surrounds a substantially square portion of the flange 30, as seen in FIG. 2, the end edges of each rung abutting the web portion of a side rail above and below the flange 30.

For securing the rung ends to the side rails, joiners 37 are provided, as shown in FIGS. 7 and 8. As best seen in FIG. 4, each rung side 33 has rectangular slots 38 and 39 therethrough, the slot widths being such that a joiner 37 may be inserted with a slide fit. The slots 38 in each rung side are horizontally aligned with the slots 38 in the other side, and the slots 39 are also horizontally aligned in the two rung sides.

The end 40 of each slot 38 and 39 which is adjacent to the rung end 36 is precisely spaced from the rung end edge. As seen in FIG. 2, when the rung sides are inserted in the slots 31—31 and a joiner 37 is driven through the horizontally aligned slots, one edge of joiner 37 is against the vertical portion of flange 30 and the other edge is wedged against the end 40 of the slot so that the rung end edges 36 are forced against the web of the side rail above and below the flange slots 31. Each joiner 37 has an end tapered at 41 to aid in the wedging action and the spacing between rung slot edge 40 and the end edge 36 of the rung is such as to provide a drive fit of the joiner in its slot.

The slots 38 are spaced from the rung top 32 and the slots 39 are spaced from the rung bottom flanges 34 and, as seen in FIG. 2, this spacing is such that when a joiner 37 is driven into its slot contact is made between the joiner and either the upper or lower portion of the flange 30. Preferably a joiner is used in slots 38 at one end of a rung and in slots 39 at the other rung end. This alternate use of slots 38 and 39 can be reversed in the adjacent rung.

Referring now to FIG. 9, a hanger 24 is shown engaged in the lower groove 26 of side rail 22L of section 20. Hanger 24, shown also in FIGS. 11 and 12, has a projecting portion 42 and a rail-engaging portion 43 at its opposite ends. The projecting portion is flat and is horizontally disposed when in its normal engaged position, as shown in FIG. 9. A hole 44, through the projecting portion, provides means for securing the hanger to its support, here shown as hanger rod 45 and its securing means, the nuts 46 and 47.

The rail-engaging portion 43 has a width, shown in FIG. 10, such that this portion may be inserted in the rail slot 26 when the projecting portion 42 is turned to a vertical disposition. When turned to its normal disposition, the upper and lower surfaces 48 of the rail-engaging portion 43, are arcuately curved, as shown in FIG. 11, to allow the 90° turning of this end. Surfaces 48—48 are divergently tapered toward the end of hanger 24 so as to be engaged in the flange groove 26 when the hanger is in its normal position.

Referring to FIG. 12, a side rail connector 50 is shown engaged in the groove 26 at the end of a rail 22L and projecting therefrom. As shown in FIG. 13, the connector 50 is of sufficient length to be inserted for half its length in the groove 26 of the rail of one section and to have its other end inserted in the groove of the rail of another section in end-to-end abutting relation to the first section. A plurality of threaded holes 51 through connector 50 are provided for pointed securing setscrews 52, such as shown in FIG. 15. Connector 50 has the same keystone shape as the groove 26 and when screws 52 are tightened they secure the connector in position in both rails during the securing of the abutting sections in position.

Shown in FIGS. 9 and 14 is a smaller upper connector 53 for also aligning the side rails of abutting sections. Connector 53 is of the same keystone, cross-sectional configuration as the upper groove 25 and has a plurality of threaded holes 54 therethrough for use with pointed setscrews 55 indicated in FIG. 9.

Referring again to FIG. 9, it will be noted that a second section 20' is fragmentarily shown with its rungs 23' resting on the substantially horizontal, outwardly projecting top flange 28 of the side rail 22L of section 20. Flange 29' of the side rail of the upper section is of sufficient length to extend past the top flange 28 of the lower section thus adapting these tray sections to be nested and suspended or otherwise supported in nested relation.

It will be apparent that there has been herein described a cable tray which may be assembled, or disassembled and reassembled at the site without special tools or apparatus. Moreover, the means for fastening the rungs to the side rails, for securing hangers to the side rails, and for securing the aligning means for endwise abutting side rails permit a construction without sharp edges or protruding fastening means which can injure the protective covering of the cables.

I claim:

1. A cable tray section, comprising: a sheet metal side rail at each side, a plurality of hollow, bent sheet metal rungs substantially rectangular in cross section, each rung bottom comprising horizontal flanges spaced on either side of an opening to the rung interior, each side rail having an upstanding web, the web having an inwardly-offset hollow flange formed adjacent to and along its bottom edge, the hollow flange having three sides bent about a keystone-shaped, outwardly opening groove, the groove being narrower across its open side than across its inward and closed side, the hollow flange having spaced pairs of vertically-extending slots thereacross at selected spaced intervals along each rail, each rung-end having its sides engaged in the hollow flange paired slots and the rung-ends abutting the upstanding webs above and below the hollow flange, at least one rung joiner for each rung-end, each joiner being longer than the width of the rung and substantially rectangular in cross section, each rung-end having at least one pair of horizontally aligned rectangular joiner slots through its sides receiving a joiner, each joiner having a tapered end adapted to be inserted in a rung-end slot, the rung-end slots being spaced from the rung-ends a selected distance and drivingly receiving a joiner therethrough and clampingly securing the rung-end against the abutting adjacent flange web, a plurality of hangers, each hanger having a railengaging portion at one end and a flat, normally horizontallydisposed, projecting portion at the other end, the projecting portion having a hole therethrough the rail-engaging portion having a length and normally horizontal width adapting this portion to be inserted in the outwardly-opening groove when the projecting portion is vertically disposed, the normally upper and lower surfaces of the railengaging portion being arcuately curved from side to side and being outwardly tapered lengthwise of the hanger to conform to the keystone shape of the rail groove, the rail engaging portion being inserted in the rail groove and rotated 90° until the projecting portion is turned to its normal horizontal disposition, the rungs being first secured to the side rails and the hangers thereafter secured in place between selected rungs, and table tray support rods each having one end secured to supporting structure and having its other end passing through a respective hanger projecting portion hole and secured thereto.

2. A cable tray comprising a plurality of like sections interconnected in end-to-end abutting relation; each section having a sheet metal side rail at each side, a plurality of sheet metal rungs substantially square in cross section, each rung bottom comprising horizontal flanges spaced on either side of an opening to the rung interior; a plurality of rung joiners; and a plurality of hangers; the side rails each having an upstanding web, the web being formed along its top edge about three sides of a keystone-shaped, outwardly opening, upper groove having a bottom extending inward, a closed side extending upward, and a top extending outward of the rail, the upper groove being narrower across its open side than across its inward, closed side; the web having an inwardly offset hollow flange formed adjacent to and along its bottom edge, the hollow flange having three sides bent about a keystone-shaped, outwardly opening lower groove; the lower groove being narrower across its open side than across its inward, closed side; the hollow flange having spaced pairs of vertically extending slots thereacross at selected spaced intervals along each rail, whereby each rung-end is adapted to have its sides engaged in the flange paired-slots and the rung-ends abutting the upstanding rail webs above and below the hollow flange; each joiner being longer than the width of the rung and substantially rectangular in cross section; each rung-end having at least one pair of horizontally aligned rectangular joiner slots through its sides receiving a joiner, each joiner having a tapered end adapted to be inserted in a rung-end slot, and the rung-end slots being spaced from the rung ends a selected distance so as to receive a joiner between the outer end of the rung-end slot and the closed inner side of the side rail hollow flange with a drive fit when the rung sides are received in the paired flange slots, the joiners being driven through the rung-end slots securing the rungs to the side rails; each hanger being received in an outwardly opening lower groove and having a rail-engaging portion at one end and a flat, normally horizontally disposed projecting portion at the other end; the projecting portion having a hole therethrough, the rail-engaging portion having a length and a normally horizontal width for insertion in the outwardly opening lower groove when the projecting portion is vertically disposed, the normally upper and lower surfaces of the rail engaging portion being arcuately curved from side to side and being outwardly tapered lengthwise of the hanger to conform to the keystone shape of the lower groove when the projecting portion is horizontally disposed; whereby the rungs are first secured to the side rails and the hangers thereafter secured between selected rungs.

3. The cable tray defined in claim 2 having a pair of upper connectors and a pair of lower connectors for each endwise abutting pair of sections for aligning the endwise abutting side rails, the spacing of the first and last rung of each section from the side rail ends being at least one half the length of each connector, the upper connectors having a cross-sectional configuration conforming to that of the side rail upper grooves and the lower connectors having a cross-sectional configuration conforming to the side rail lower grooves, each connector having a plurality of threaded holes therethrough, and pointed set screws engaged in the holes of each connector when the connectors are engaged in the grooves in both the abutting side rails for securing the connectors in place during erection of the cable tray.

4. The cable tray defined in claim 2 wherein each side rail of each section has a web portion pendant from the side rail flange of sufficient length to extend past the top of the upper groove of a lower section side rail when an upper section is placed on top of a lower section, the rungs of the upper section resting on the upper groove tops of the side rails of the lower section.

* * * * *